US011931761B2

(12) United States Patent
Strickler

(10) Patent No.: US 11,931,761 B2
(45) Date of Patent: Mar. 19, 2024

(54) TORPEDO NOZZLE APPARATUS

(71) Applicant: Hydra-Cone, Inc., York, PA (US)

(72) Inventor: Jeffrey Strickler, Dover, PA (US)

(73) Assignee: Hydra-Cone, Inc., York, PA (US)

( * ) Notice: Subject to any disclaimer, the term of this patent is extended or adjusted under 35 U.S.C. 154(b) by 247 days.

(21) Appl. No.: 17/592,906

(22) Filed: Feb. 4, 2022

(65) Prior Publication Data

US 2023/0249203 A1 Aug. 10, 2023

(51) Int. Cl.
*B05B 7/04* (2006.01)
*B05B 1/34* (2006.01)
*B05B 7/00* (2006.01)

(52) U.S. Cl.
CPC .......... *B05B 7/0483* (2013.01); *B05B 1/3436* (2013.01); *B05B 7/0012* (2013.01)

(58) Field of Classification Search
CPC .... B05B 7/0483; B05B 1/3436; B05B 7/0012
See application file for complete search history.

(56) References Cited

U.S. PATENT DOCUMENTS 3,770,209 A * 11/1973 Wilcox ................. B05B 7/0483 239/434
4,349,156 A * 9/1982 Haruch ................... B05B 1/042 239/432
4,511,087 A * 4/1985 Matsumoto ........... B05B 7/0433 239/433
4,923,121 A 5/1990 Boyer
6,024,301 A * 2/2000 Hurley .................. B05B 1/3484 239/492
6,168,503 B1 1/2001 Pao et al.
6,422,827 B1 * 7/2002 Hara ..................... B01F 25/313 239/419
2006/0163384 A1 7/2006 Colavito et al.
2009/0226362 A1 * 9/2009 Randolph, III ....... B05B 7/0475 423/539
2015/0330348 A1 * 11/2015 Mulye ................ F02M 61/1813 29/890.128
2015/0354886 A1 * 12/2015 Sinko .................... F25D 31/006 62/390
2019/0308299 A1 10/2019 Kaya
2020/0147624 A1 5/2020 Hamaura et al.

FOREIGN PATENT DOCUMENTS

CN 102962151 B 5/2015
CN 110538735 A 12/2019
CN 110685667 A 1/2020

(Continued)

*Primary Examiner* — Jeremy Carroll
(74) *Attorney, Agent, or Firm* — Hilary J. Sumner

(57) ABSTRACT

The present invention embodies a spray nozzle for mixing and spraying a mixture of liquid and dry material. The device is comprised of a liquid injector, a torpedo, a spray tip, and a mixing chamber. The mixing chamber is connected to a hose that directs dry material through the apparatus. Dry material is forced around and over the first end of the torpedo within the mixing chamber, slowing the speed of that material and focusing it toward the second end of the torpedo where it mixes with liquid exiting the spray tip at this second end. The torpedo blends the dry and liquid components more uniformly resulting in a more homogenous material.

16 Claims, 7 Drawing Sheets

SECTION A-A

(56) References Cited

FOREIGN PATENT DOCUMENTS

| | | | |
|---|---|---|---|
| DE | 4127886 | C2 | 11/1994 |
| EP | 0780528 | B1 | 4/2003 |
| EP | 3323501 | B1 | 8/2019 |
| EP | 3551409 | A1 | 10/2019 |
| JP | 2008126200 | A | 6/2008 |
| JP | 2011098284 | A | 5/2011 |

* cited by examiner

SECTION A-A

SECTION B-B

SECTION C-C

SECTION D-D

TORPEDO NOZZLE APPARATUS

BACKGROUND OF THE INVENTION

Fireproofing, soundproofing, thermal insulation, and similar materials may be directed to and sprayed directly on a surface provided that it can stick to the desired substrate. A suspension of wetted material is needed where the surface is non-horizontal in nature or where the material is hazardous in its dry form. The slurry may be mixed by hand to achieve the preferred consistency or alternatively, dry material may be blown or pumped through a hose and into a wetting area where water, adhesive, or similar liquid are showered onto the dry material passing by it. The two materials combine within a wetting chamber inside the nozzle apparatus or they may intermix at the nozzle exit.

Present inventions typically introduce the desired liquid through one or more simple ports within a standard hose. The volume of liquid and selected spray pattern within the port determines the extent to which the dry material moving past the ports is dampened. Because the ports are located along the walls of the hose or nozzle, there is often a disparate moistening of the final slurry. The blown dry material may be dissimilar in size or density and the wetted combination of clumped material may stick or clog the nozzle.

Other designs teach the injection of liquid through a port and into a cone-shaped mixing chamber. While the cone shape increases the velocity of the dry material as it moves toward the exit nozzle, clumps of material may remain and the resulting mixture may be unevenly saturated.

Another design teaches the use of a tube or pipe placed generally within the center of the hose. This tube or pipe sprays water from a nozzle. While the angle of spray from the nozzle may be adjusted, some portions of the dry material are invariably wetted more than others.

Still another design teaches the introduction of dry material through a similar series of ports. Liquid is injected through a fan-shaped cone within the hose or nozzle to more thoroughly wet the dry material. Again, this configuration does little to address any clumps of dry material that may by injected into the wetting chamber and the droplet size and spray angle do not appear to be adjustable. This may lead to inconsistent wetting or obstructions within the nozzle.

If a required and substantially uniform consistency is not achieved within the mixing chamber, the final slurry may be too dry or too wet to adhere to the substrate. Uneven wetting of the material makes application more difficult for the user and may result in non-uniform thickness of the sprayed material, undesirable scattering of dry material, waste, clogging, or poor surface finish. Additionally, the value of the material may be undermined if a non-homogenous layer is applied as the desired insulation value or other required material properties may not be realized.

There is therefore a need in the art for a spray nozzle that consistently mixes a desired liquid or liquids with dry material within the nozzle itself.

BRIEF SUMMARY OF THE INVENTION

The present invention seeks to provide a durable nozzle apparatus that consistently and adjustably wets a selected dry material moving through a hose. The torpedo nozzle apparatus breaks up the dry matter flowing within it and directs that matter to a liquid injector where it is uniformly dampened. The resulting improvement in the homogeneity of the slurry leads to a superior surface finish and enhanced material properties of the final product.

The torpedo nozzle apparatus is connected to or forms an integral part of a hose. The device is comprised of a liquid injector, a torpedo, a spray tip, and a mixing chamber. Liquid may be injected directly from a tube or pipe placed in a cavity within the torpedo such that the torpedo acts as the liquid injector. Alternatively, the liquid may be delivered through a tube or pipe fitted directly within the torpedo. The spray tip attached to the liquid injector may be adjustable in its angle of spray and may sit within or may protrude from the torpedo.

Dry material is pumped or blown through the hose and into the mixing chamber where it makes contact with an inlet cone of the torpedo. As air and dry material flow around the torpedo, the conical shape of this inlet cone directs movement of the dry matter to the narrow space between the main body of the torpedo and the inner wall of the hose. This helps to loosen the material and break up large clusters of dry matter as it continues along its path of travel. The squeezing of the dry material into the narrowed space reduces the speed of airflow. The loss of velocity translates to higher pressure within this narrow space and the dry material is subsequently forced along the main body and onto a blending section of the torpedo. The conical shape of this blending section directs and funnels the dry matter toward the liquid injector. Liquid exits the liquid injector within or adjacent to the blending section of the torpedo, thereby wetting the focused dry material more effectively than prior inventions.

REFERENCE NUMERAL LISTING

5 Torpedo Nozzle Apparatus
10 Liquid Injector

15 Torpedo
20 Spray Tip
25 Mixing chamber
30 Funneling Section
35 Throttling Section
40 Blending Section
45 Nozzle Outlet
50 Hose
55 Dry Matter/Dry Material
60 Liquid
65 Exterior Surface of Torpedo
70 Interior Wall of Torpedo Nozzle Apparatus
75 Wall Thickness of Torpedo Nozzle Apparatus
80 Liquid Entry Point
85 First end of Torpedo/Inlet Cone
90 Main Body
95 Second End of Torpedo/Blending Cone
100 Tube/Cavity/Channel/Pipe
105 Fluting
110 Shut Off Valve
115 Pressure Gauge
120 Manifold
125 Whirl Rod
130 Screen Strainer
135 Ring Mount
140 Ring Mount Liquid Supply
$L_{MB}$ Length of Main Body
$L_{MC}$ Length of Mixing Chamber
$C_L$ Longitudinal Center of the Mixing Chamber
α Opening Angle of the Inlet Cone
β Opening Angle of the Blending Cone

DETAILED DESCRIPTION OF THE INVENTION

Specific terms are used for the sake of clarity in describing the embodiments below. The invention is not intended to be limited to the selected terminology and it should be understood that each specific element includes all technical equivalents operating in a similar manner to accomplish a similar function.

In this patent application, a hollow tube for transferring liquids from one point to another in a substantially watertight manner both to and within the nozzle apparatus such as a void, cavity, pipe, channel, duct, or conduit shall be referred to as a "tube" or "cavity." Flexible piping connected to the nozzle apparatus for the transfer of dry material shall be referred to as a "hose." It should be recognized that additional components such as gaskets, washers and the like may be required to achieve a watertight seal at unions and connections within the apparatus.

Figure 1A:
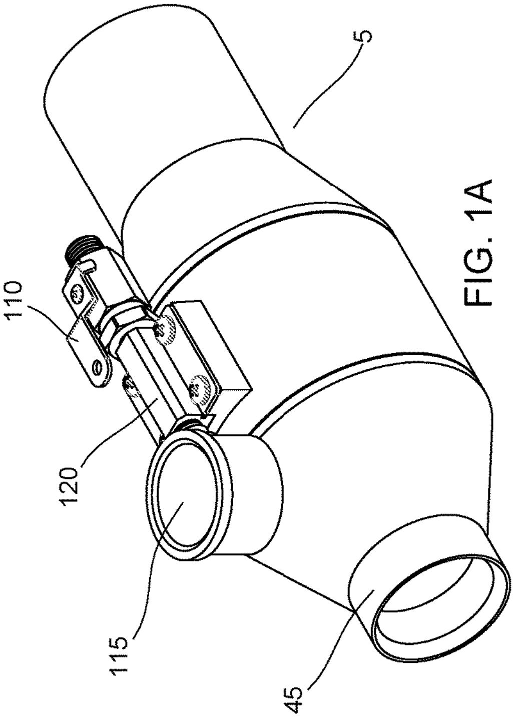
FIG. 1A is a perspective view of a torpedo nozzle apparatus having a pressure gauge, shutoff valve and manifold connected to the nozzle assembly
Figure 1C:
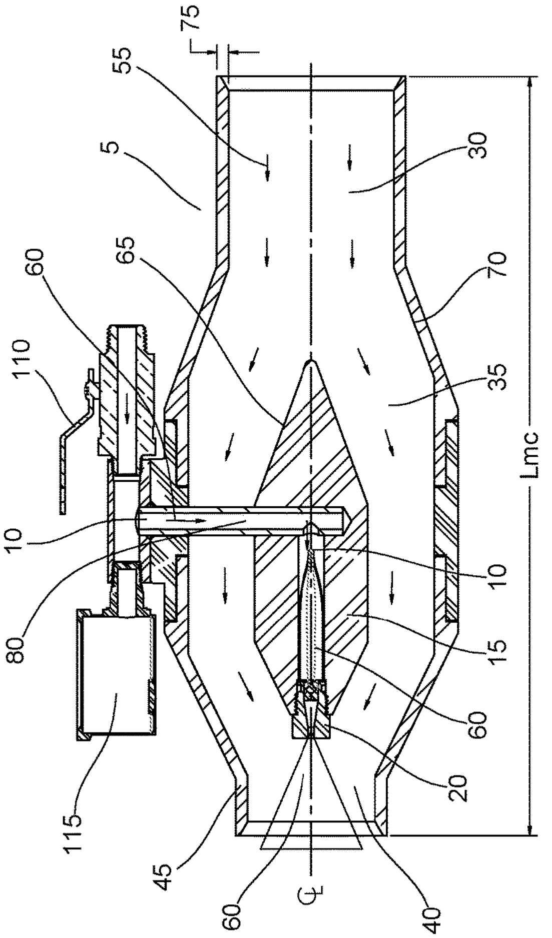
FIG. 1C is a cross-sectional view of the torpedo nozzle apparatus of FIG. 1A taken at line A-A in FIG. 1B
Figure 1B:
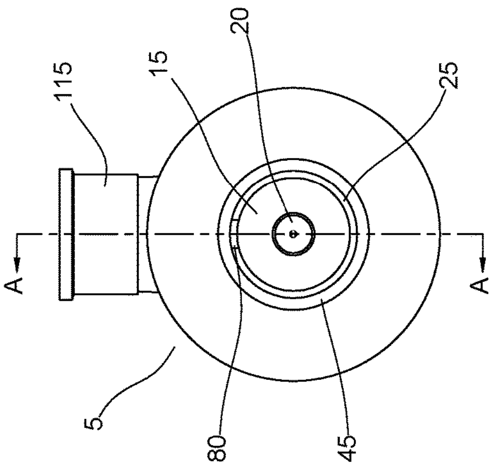
FIG. 1B is a side view of a torpedo nozzle assembly of FIG. 1A
Figures 2A, 2B, 2C:
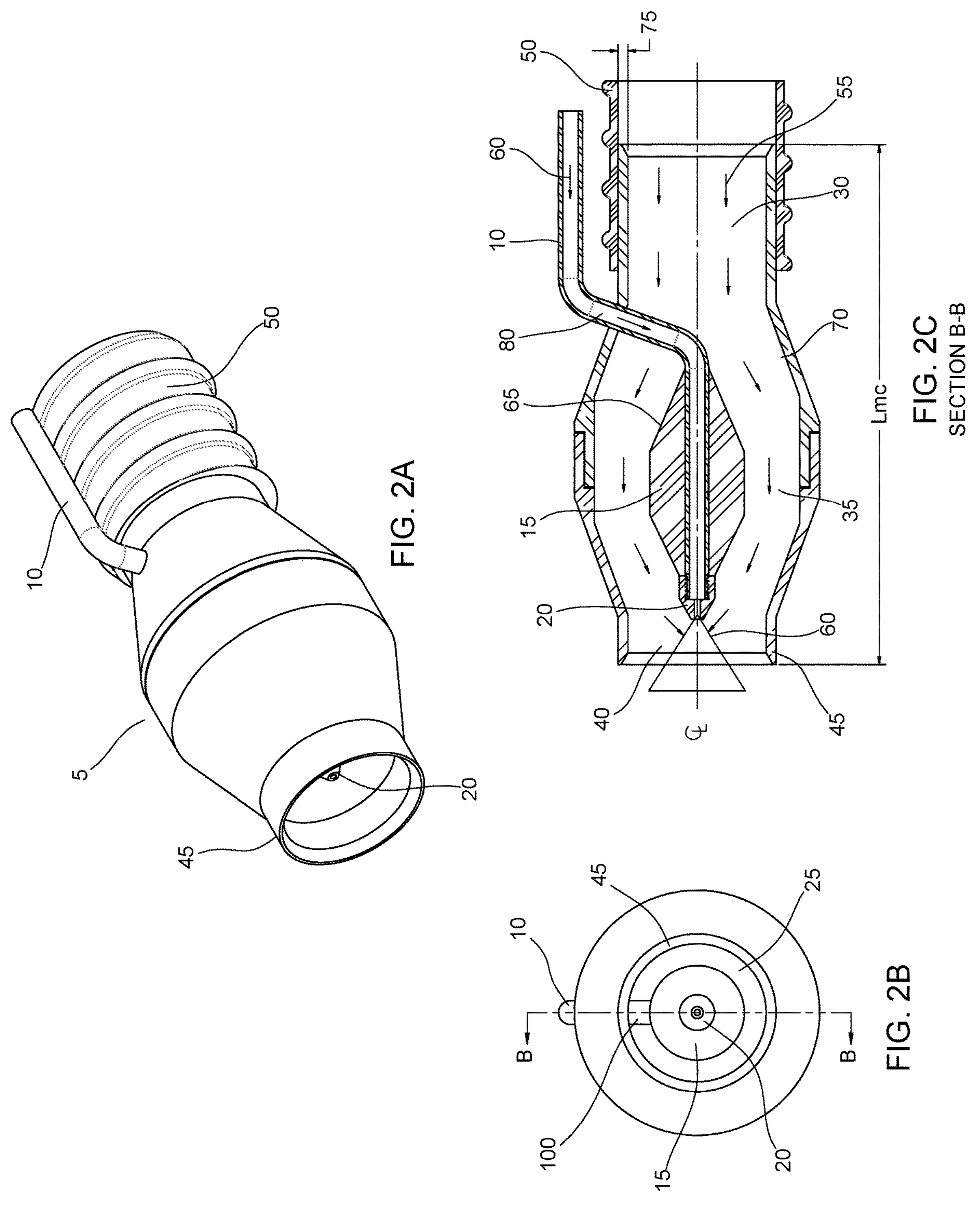
FIG. 2A is a perspective view of a torpedo nozzle apparatus wherein the liquid injector is comprised of a tube and the torpedo is slipped onto the liquid injector
FIG. 2B is a side view of a torpedo nozzle apparatus of FIG. 2A
FIG. 2C is a cross-sectional view of the torpedo nozzle apparatus of FIG. 2A taken at line B-B in FIG. 2B

Referring to FIGS. 1A-1C, the torpedo nozzle apparatus 5 is comprised of a liquid injector 10, a torpedo 15, a spray tip 20, and a mixing chamber 25. The mixing chamber 25 is comprised of three sections: a funneling section 30, a throttling section 35, and a blending section 40. The funneling section 30 may be removeably attached to a hose 50 that transfers dry material from one location to another as illustrated in FIGS. 2A and 2B. Alternatively, the funneling section 30 may form an integral part of the hose 50. The The three sections of the mixing chamber 25 may be removeably attached to one another as shown in FIGS. 1A and 1C. Alternatively, the apparatus may be manufactured such that the torpedo nozzle apparatus 5 breaks into two sections as illustrated in FIGS. 2A and 2C. Inventor anticipates that these sections will include a means of quick connection and disconnection to facilitate the adjustment of the spray tip 20 which is either attached to or forms an integral part of the liquid injector 10. Such quick connection may comprise a spline. The spray tip 20 may be adjustable in its angle of spray and may sit within or may protrude from the torpedo 15.

Referring again to FIGS. 1A-1C and 2A-2C, dry material 55 is blown through the hose 50 and into the funneling section 30 of the mixing chamber 25. Liquid 60 is simultaneously propelled through the liquid injector 10 as described in more detail below. The size and shape of the torpedo 15 forces the dry material 55 to move between the exterior surface 65 of the torpedo 15 and the interior wall 70 of the mixing chamber 25 thereby decreasing the velocity of the dry material 55 and increasing the pressure exerted on this matter 55. The higher pressure within the throttling section 35 works in conjunction with the shape of the blending cone 95 to focus the movement of the dry material 55 toward the liquid 60 exiting from the spray tip 20 within the blending section 40. The concentration of dry material 55 at the spray tip 20 results in more thoroughly and uniformly wetted material as the slurry exits the nozzle outlet 45.

The funneling section 30 of the mixing chamber 25 tapers to the substantially cylindrical throttling section 35 which has a larger diameter than that of the hose 50. This throttling section 35 then transitions to a blending section 40 having a smaller diameter than that of the throttling section 35 as illustrated in FIGS. 1C and 2C. The tapers between the three sections of the mixing chamber 25 assist in driving dry material 55 around the torpedo 15 thereby allowing the liquid and dry components to more readily intersperse within the blending section 40. One or both the funneling section 30 and blending section 40 may be removeably attached to the throttling section 35 as noted above. This allows the user to more easily access and replace the spray tip 20 as described in more detail below.

The liquid injector 10 penetrates the wall thickness 75 of the torpedo nozzle apparatus 5 at the liquid entry point 80 as shown in FIGS. 1C and 2C. The liquid injector 10 may comprise a tube 100 mechanically fastened to a cavity within the torpedo 15. Alternatively, the liquid injector 10 may comprise one or more tubes or cavities 100 fitted within the torpedo 15 as shown in FIGS. 1C, 2C and FIG. 3C.

In one embodiment, the torpedo 15 is slipped onto the liquid injector 10 as shown in FIGS. 2A-2C and the spray tip 20 is threaded to the end of the tube 100. In another embodiment, a horizontal tube 100 makes a watertight connection with a vertical cavity or tube 100 within the torpedo 15 as shown in FIGS. 1C, 3C and FIG. 4. In this embodiment, the spray tip 20 is attached to a threaded tube 100 within the torpedo 15; however it should be recognized that the spray tip may be connected through other connections means such as a quick connect fitting. In a third embodiment, the spray tip 20 is attached to a threaded cavity 100 within the torpedo 15 such that the torpedo 15 acts as the liquid injector 10.

Referring to FIGS. 1B and 2B, the longitudinal axis of the torpedo 15 is substantially centered along the longitudinal axis $C_L$ of the mixing chamber 25 and is comprised of a first end hereinafter referred to as the inlet cone 85, a main body 90, and a second end hereinafter referred to as the blending cone 95. The diameter of the main body 90 ideally occupies approximately one quarter to one-third of the diameter of the mixing chamber 25 to facilitate proper wetting.

Figure 3A:
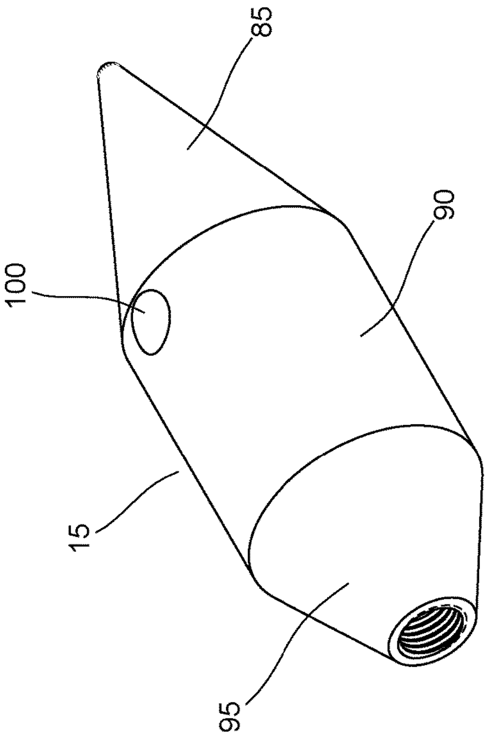
FIG. 3A is a perspective view of one embodiment of a torpedo
Figure 3C:
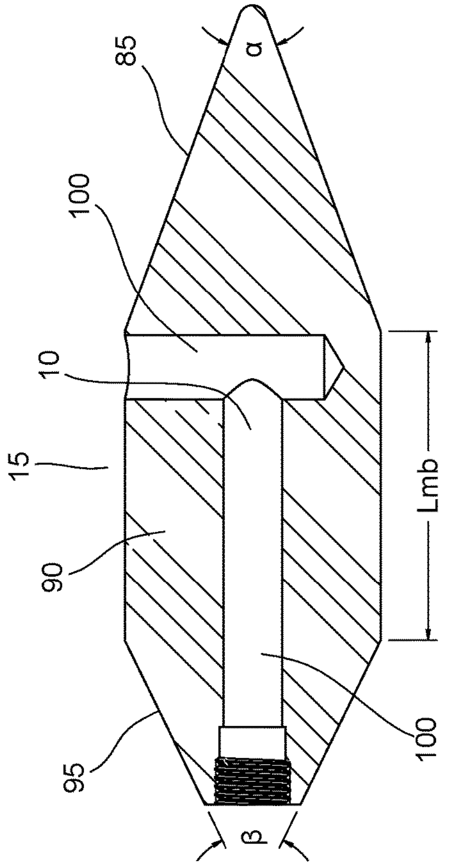
FIG. 3C is a cross-sectional view of the torpedo of FIG. 3A taken at line C-C in FIG. 3B
Figure 3B:
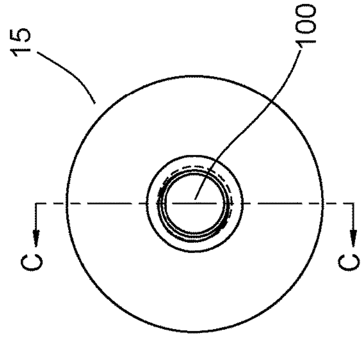
FIG. 3B is a side view of the torpedo of FIG. 3A
Figure 4:
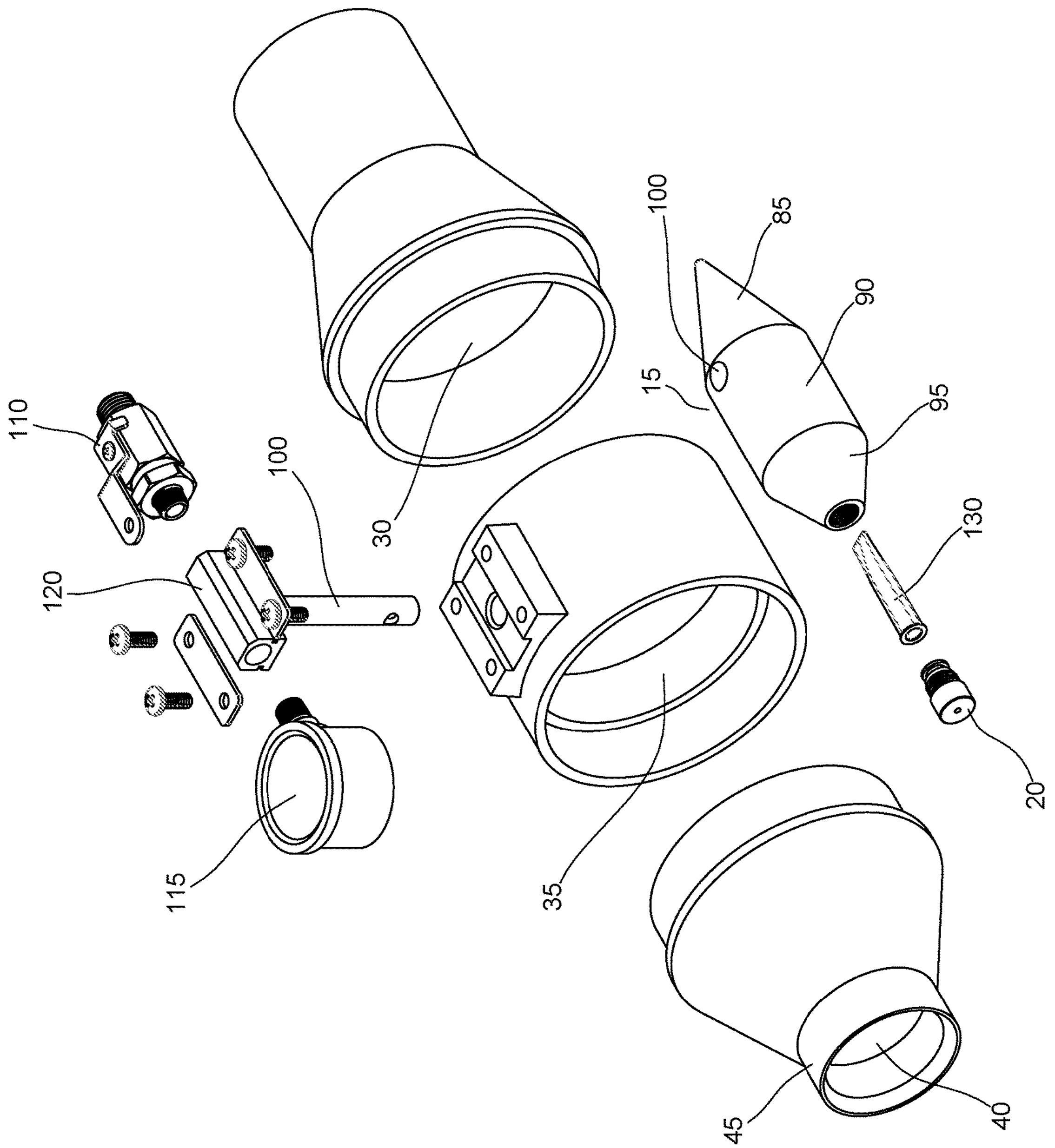
FIG. 4 is an exploded perspective view of a torpedo nozzle apparatus having a manifold, pressure gauge, and shut off valve mechanically fastened to the exterior of the nozzle assembly

The main body 90 is substantially cylindrical in shape as illustrated in FIGS. 3A and 3C. The length $L_{MB}$ of the main body 90 optimally ranges from 38 to 55 percent of the length $L_{MT}$ of the mixing chamber 25 depicted in FIGS. 1C and 2C.

Figure 5C:
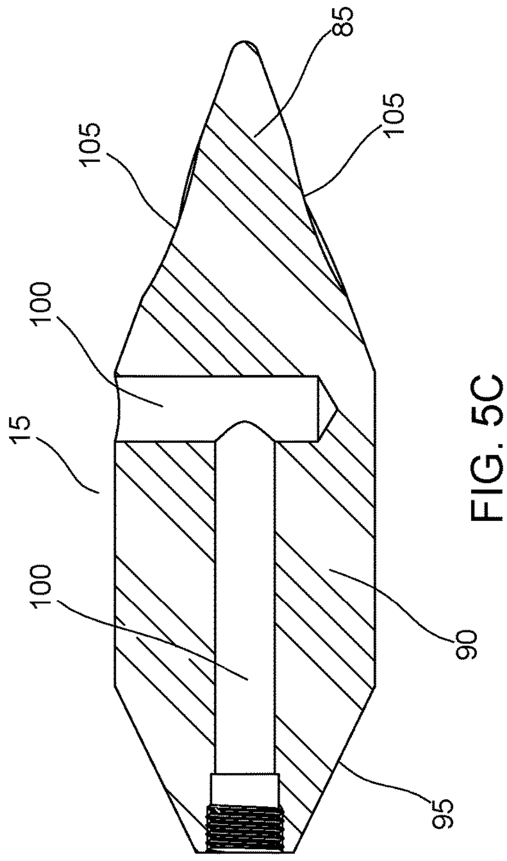
FIG. 5C is a cross-sectional view of the torpedo of FIG. 5A taken at line D-D in FIG. 5B
Figure 5A:
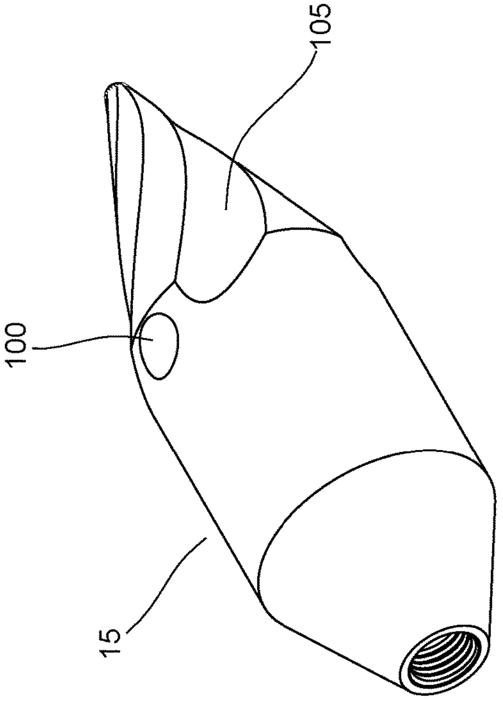
FIG. 5A is a perspective view of one embodiment of a torpedo having flutes on the inlet cone
Figure 5B:
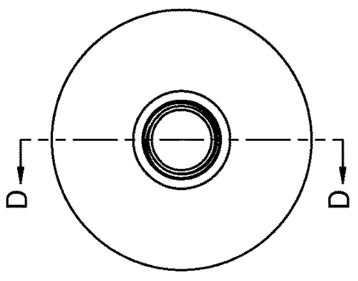
FIG. 5B is a side view of the torpedo of FIG. 5A

Both the inlet cone 85 and blending cone 95 are substantially conical in shape; however, the inlet cone 85 ideally has an opening angle α ranging from 30-40° to direct material toward the interior wall 75 of the torpedo nozzle apparatus 5 while the ideal opening angle β of the nozzle section 55 ranges from 40-52° to focus the movement of the dry material 55 toward the blending section 40 of the mixing chamber 25. Referring now to FIG. 5, the inlet cone 85 may include at least two optional flutes 105 to further direct and channel dry material 55 from the hose 50 to the main body 90.

Referring once again to FIG. 4, the liquid injector 10 may comprise a shut off valve 110 to control the flow of liquid 60 to the torpedo nozzle apparatus 5. The pressure of the liquid 60 may be adjustable through a metering or similar valve in order to achieve the desired consistency and material finish. The apparatus 5 may also include an optional pressure gauge 115 to monitor pressure of the liquid 60 entering the liquid injector 10. Pressure within the liquid injector 10 optimally ranges from 50 psi to 250 psi. In one embodiment, both the pressure gauge 110 and shut off valve 105 are connected to a manifold 120 that is mechanically fastened to the torpedo 15 as illustrated in FIGS. 1A, 1C and 4. This manifold is then connected to a vertical tube 100 which is connected to a horizontal tube 100 that is attached to the spray tip 20.

Dry matter may come in varying sizes, shapes, and densities depending on the material selected for the particular application. Every material will therefore require its own pressure and spray setting. Typically, an operator works with the dry matter, adjusting the angle of spray and liquid pressure until the desired consistency and finish is achieved. Spray tips 20 within the apparatus are interchangeable and a wide assortment of tips 20 providing specific liquid flow rates and angles of spray may be selectively mounted on the liquid injector 10. Ideally the angle of spray exiting the spray tip 20 will range from 30° to 50°. Any angle greater than this would direct liquid 60 to the interior wall of the torpedo nozzle apparatus 70 and would result in material buildup on that wall surface 70. Any angle less than this would not sufficiently wet the dry material 55.

Figure 6:
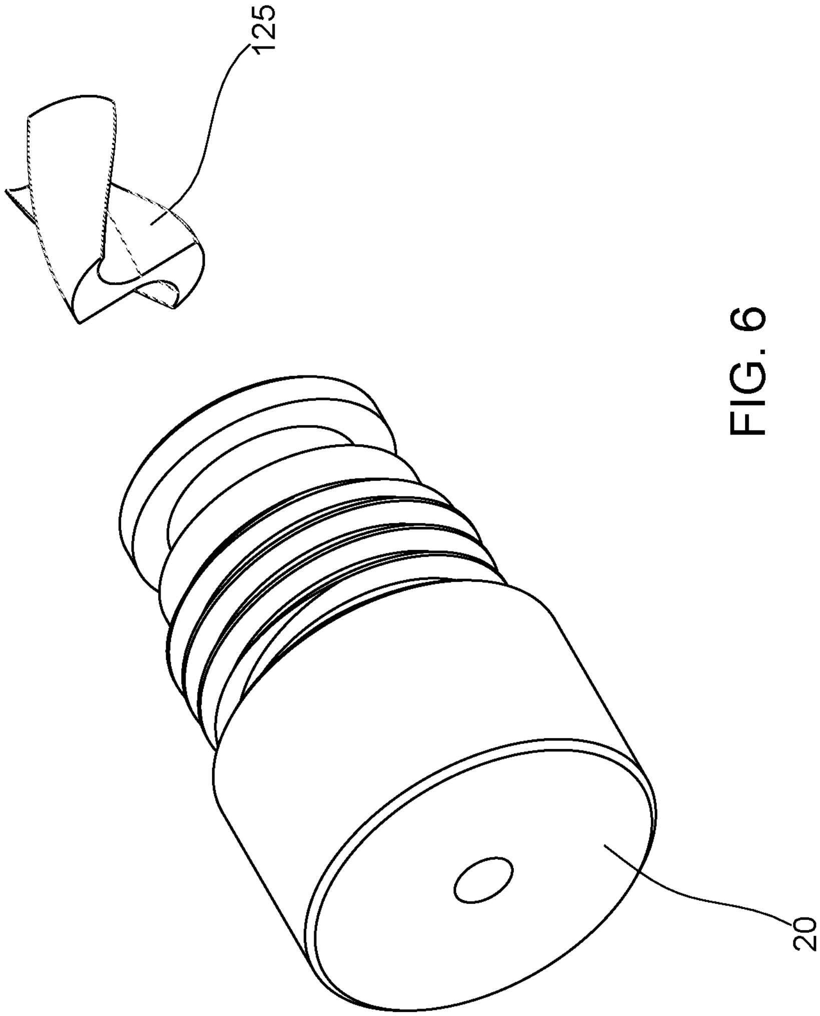
FIG. 6 is an exploded perspective view of a spray nozzle having a whirl rod

Referring now to FIG. 6, a whirl rod 125 is included within the interior of the spray tip 20, rotating the liquid 60 as it exits that tip 20. This spinning or rotation of the exiting liquid 60 creates a hollow conical spray pattern having more homogenous droplet sizes to facilitate a more uniform intermixing of the liquid and dry materials. An optional screen strainer 130 may be placed within the tube 100 adjacent to the spray tip 20 as shown in FIG. 4. This strainer 130 prevents solid material beyond the size of the mesh openings within that screen 130 from entering the spray tip 20 and causing an erratic spray pattern. The strainer 130 may be easily cleaned and replaced as needed where the sections of the torpedo nozzle apparatus 5 are detachable.

Although the nozzle outlet 45 is depicted as cylindrical in shape in FIGS. 1A, 2A, and 4, this outlet 45 may assume any shape or size that facilitates the proper application of the mixed material such as flat, tapered, or any other commonly used nozzle shape. The funneling section 30 may also be sized to accommodate any size or shape of hose 50.

Figure 7:
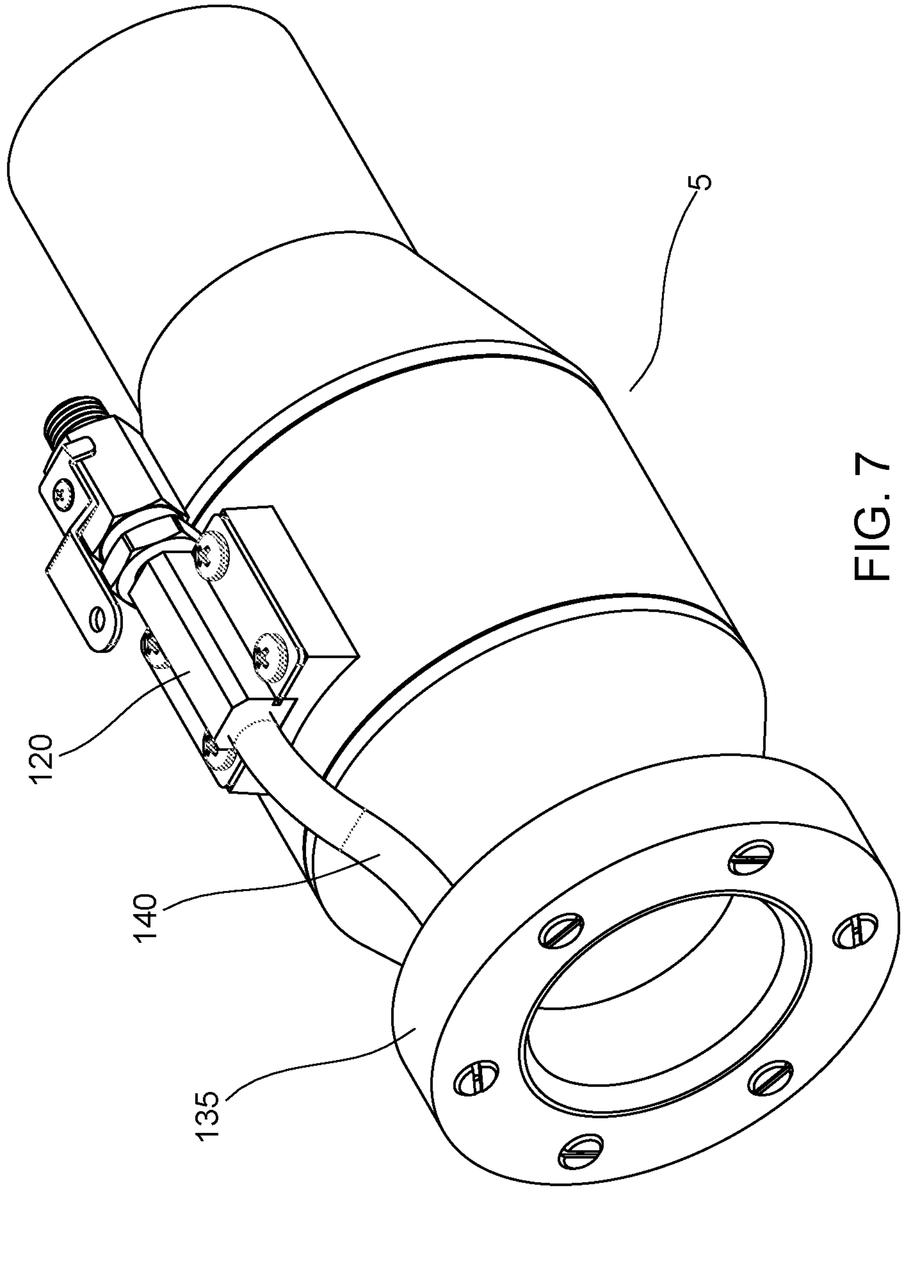
FIG. 7 is a perspective view of a torpedo nozzle apparatus having a ring mount

Referring now to FIG. 7, an optional ring mount 130 may be added to the exterior of the nozzle outlet to provide additional wetting when needed. In this embodiment, an additional source of liquid is directed to the ring mount 135 via the ring mount liquid supply 140. The ring mount 135 typically includes at least two spray tips; however, it may comprise as many or as few additional spray tips as required for the particular application. The ring mount 135 may be mechanically fastened to the nozzle outlet 45 with standard fasteners, a press fit, or through a quick connect device.

While the above description contains many specifics, these should be considered exemplifications of one or more embodiments rather than limitations on the scope of the invention. As previously discussed, many variations are possible and the scope of the invention should not be restricted by the examples illustrated herein.

The invention claimed is:

1. A torpedo spray nozzle apparatus for mixing and dispensing a dry material flowing through a connected hose with a liquid flowing through the torpedo spray nozzle apparatus, the torpedo spray nozzle comprising:

a mixing chamber having a longitudinal axis, an interior, a nozzle end, and a connection end, the connection end being removeably attached to a hose supplying dry material and wherein the interior of the mixing chamber comprises a tapered funneling section, a cylindrical throttling section, and a tapered blending section;

a liquid injector connected to a liquid supply, wherein said liquid injector penetrates the mixing chamber;

a torpedo connected to or forming an integral part of the liquid injector and comprising a longitudinal axis, a conically shaped first end, a cylindrically shaped main body, and a conically shaped second end, the longitudinal axis of the torpedo being substantially aligned with the longitudinal axis of the mixing chamber such that the conically shaped first end is positioned within the throttling section of the mixing chamber and the conically shaped second end is positioned within the blending section of the mixing chamber; and a spray tip comprising a whirl rod, said whirl rod having a length and a longitudinal axis, wherein said whirl rod comprises at least two helical slots about said longitudinal axis and wherein said slots extend along the length of said whirl rod, the spray tip being mechanically connected to the liquid injector.

2. The torpedo spray nozzle apparatus of claim 1, wherein the spray tip is removeably connected to the liquid injector.

3. The torpedo spray nozzle apparatus of claim 1, wherein the liquid injector is comprised of a tube and wherein the torpedo is slipped on to the liquid injector.

4. The torpedo spray nozzle apparatus of claim 1, wherein the tapered funneling section, the cylindrical throttling section, and the tapered blending section of the mixing chamber are removeably attached to one another.

5. The torpedo spray nozzle apparatus of claim 1, wherein the tapered funneling section and the cylindrical throttling section form a single part that is removeably attached to the tapered blending section.

6. The torpedo spray nozzle apparatus of claim 1, wherein the tapered funneling section and the cylindrical throttling section of the mixing chamber are removeably attached to one another via a first spline and wherein the cylindrical throttling section and the tapered blending section of the mixing chamber are removeably attached to one another via a second spline.

7. The torpedo spray nozzle apparatus of claim 1, wherein a shutoff valve is positioned between the liquid injector and the liquid supply.

8. The torpedo spray nozzle apparatus of claim 1, wherein a metering valve is positioned between the liquid injector and the liquid supply such that the pressure of liquid flowing within the liquid injector is adjustable.

9. The torpedo spray nozzle apparatus of claim 1, wherein the liquid injector is in fluid communication with a pressure gauge.

10. The torpedo spray nozzle apparatus of claim 1, wherein the liquid injector is in fluid communication with a manifold.

11. The torpedo spray nozzle apparatus of claim 1, wherein the conically shaped first end of the torpedo comprises an opening angle ranging from 30-40° and wherein the conically shaped second end of the torpedo comprises an opening angle ranging from 40-52°.

12. The torpedo spray nozzle apparatus of claim 1, wherein the main body of the torpedo further comprises a length and wherein the mixing chamber further comprises a length and wherein the length of the main body of the torpedo ranges from 38 to 55 percent of the length of the mixing chamber.

13. The torpedo spray nozzle apparatus of claim 1, wherein the mixing chamber further comprises a diameter and the main body of the torpedo further comprises a diameter and wherein the diameter of the main body ranges between one quarter to one-third of the diameter of the mixing chamber.

14. The torpedo spray nozzle apparatus of claim 1, wherein the first end of the torpedo further comprises at least two flutes.

15. The torpedo spray nozzle apparatus of claim 1, wherein the torpedo spray nozzle apparatus further comprises a ring mount liquid supply supplying liquid to a ring mount and wherein the ring mount is comprised of at least two additional spray nozzles and is mechanically fastened to the nozzle end of the mixing chamber.

16. The torpedo spray nozzle apparatus of claim 1, wherein the spray nozzle further comprises a strainer.

* * * * *